Feb. 16, 1960    R. P. C. RASMUSEN    2,925,538
ELECTROMAGNETIC DEVICE
Filed Dec. 31, 1956    2 Sheets-Sheet 1

Inventor
Reidar P. C. Rasmusen
By H. R. Ratter
Attorney

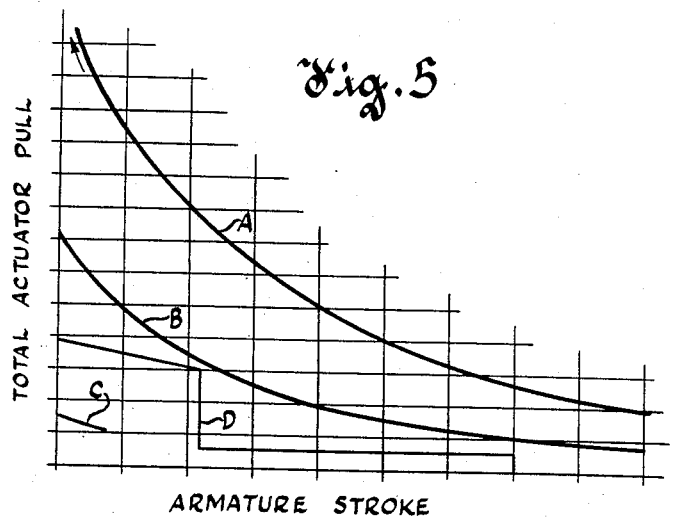
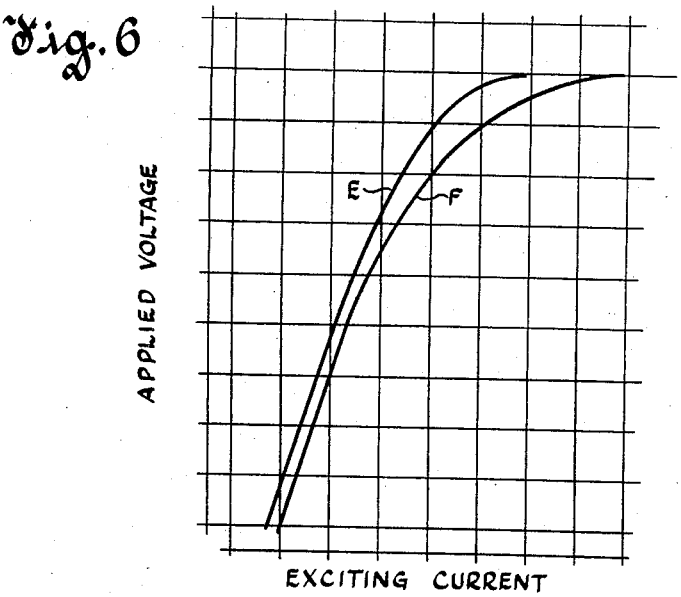

United States Patent Office 2,925,538
Patented Feb. 16, 1960

2,925,538

ELECTROMAGNETIC DEVICE

Reidar P. C. Rasmusen, Columbus, Ohio, assignor, by mesne assignments, to Cutler-Hammer, Inc., Milwaukee, Wis., a corporation of Delaware Application December 31, 1956, Serial No. 631,694

4 Claims. (Cl. 317—123)

This invention relates to improvements in electromagnetic devices.

While not limited thereto, the invention is especially applicable to alternating current contactors and relays employed in electrical control systems of aircraft and the like where good quality of performance and low noise are required.

Various expedients have been proposed to eliminate undesirable variations in magnetic attraction in alternating current contactors due to the cyclic variation of an alternating current characteristic to maintain stability of an armature position throughout such variations. Because of the lack of uniformity of pull caused by cyclic variations of voltage, an undesired or false response of the contactor may occur. This is especially true where a high degree of sensitivity is required or where the contactor is subject to shock in its usual operation. Also the lack of uniformity in attraction of the armature due to the cyclic variation of the current or voltage results in objectionable hum or noise and undesirable wear of the parts.

Among other things, it has been proposed to operate direct current contactors from an alternating current source through rectifiers. Operating temperatures of these contactors at the high speeds and altitudes attained by aircraft have become so high that use of selenium and other common types of rectifiers to operate direct current contactors is becoming increasingly impractical. Use of rectifiers to operate direct current contactors not only increases the cost but also adds several additional components to the contactor with a corresponding increase in the chance of failure.

It has also been proposed to employ a shading coil in inductive relation to the energizing coil to afford a phase displacement of the alternating current induced in the former relative to that of the latter. It should be apparent that such phase displacement affords a resultant attractive flux having an absolute value that is maintained above zero value at all times throughout the cyclic variations of the alternating current. However, the power consumed by a shading coil is directly proportional to the frequency of the alternating current applied to the energizing coil. Therefore, although a shading coil type device can be economically operated at the lower frequencies, the power consumption becomes so large at the higher frequencies such as 400 cycles used in aircraft systems as to render a shading coil impractical. Another disadvantage of a shading coil type device resides in its inability to afford a full 90 degree phase displacement between the two fluxes. The inductive reactance and resistance of a shading coil limit the phase displacement to approximately 70 degrees and, therefore, the magnetic pull is not constant.

It has also been proposed to employ a pair of energizing coils, one of the coils being energized directly from an alternating current supply source and the other coil having a phase-shifting capacitor and a resistor in series connection therewith and the supply source to obtain a phase displacement therebetween. When two coils are used, the optimum phase displacement of the magnetic fluxes is 90 degrees, although a small variation therefrom is not unsatisfactory. While this arrangement affords a substantially constant total pull on the armature, the center of application of the force on the armature will shift from one point to another corresponding to the axes of the respective coils at double the supply frequency.

In alternating current contactors operating at higher frequencies the problems attendant on non-uniformity of pull, noise, power consumption and undesirable wear become especially pronounced. Although the power consumption of a shading coil type device remains within acceptable limits at the lower frequencies and up to approximately 180 cycles where it equals that of a capacitor type device, at frequencies above 180 cycles and up to approximately 1,000 cycles the latter type is preferred. Since inrush of current is a function of frequency, the volt-amperes at an open condition of the armature might be so great as to affect the stability of the supply source at frequencies above 1,000 cycles. Additionally, noise of a given amplitude which may be tolerable to a human ear at the lower frequencies becomes objectionable at higher frequencies.

Therefore, it is desirable to provide an efficient alternating current electromagnetic device having a long operational life and minimum components to reduce the possibility of failure. A uniform total attractive force having a fixed center of application on the armature is desirable to prevent the cyclic variations of the current or voltage from materially affecting the stability of the armature position. It is also desirable to reduce the hum and noise to a minimum and to afford greater pull on the armature without a corresponding increase in its size and cost.

Accordingly, an object of the invention is to provide improved means affording the aforementioned and other functions.

A more specific object of the invention is to provide an improved alternating current electromagnetic device wherein stability of armature position is attained through uniformity of total attractive force having a fixed center of application to the armature.

A still more specific object of the invention is to provide improved means for attaining the aforementioned uniform total attractive force and a fixed center of application thereof to the armature throughout cyclic variations of the alternating current simply and economically without extraneous elements such as shading coils, rectifiers and the like.

A further specific object of the invention is to provide such electromagnetic device with improved means affording an approximately 90 degree phase displacement between the magnetic fluxes developed by pairs of energizing coils.

Another specific object of the invention is to provide an improved alternating current electromagnetic device economically operable in the range of approximately 180 to 1,000 cycles having a plurality of force components symmetrically applied to the armature.

Other objects and advantages of the invention will hereinafter appear.

While the device hereinafter described is effectively adapted to fulfill the objects stated, it is to be understood that I do not intend to confine my invention to the particular preferred embodiment of electromagnetic device disclosed, inasmuch as it is susceptible of various modifications without departing from the scope of the appended claims.

Figure 1:
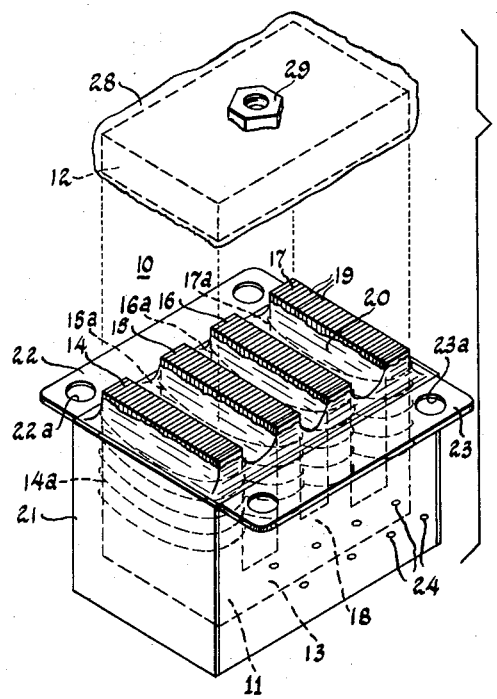
Figure 1 is a view in perspective of an electromagnetic device constructed in accordance with the present invention.
Figure 4:
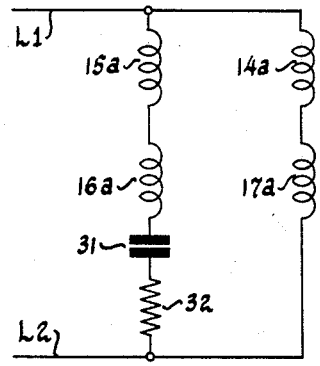
Fig. 4 illustrates diagrammatically an energizing circuit for the device shown in Fig. 1.

Fig. 5 graphically depicts pull characteristics for the device of Figs. 1 and 4; and Fig. 6 graphically depicts flux saturation characteristics for the device shown in Figs. 1 and 4.

Figure 2:
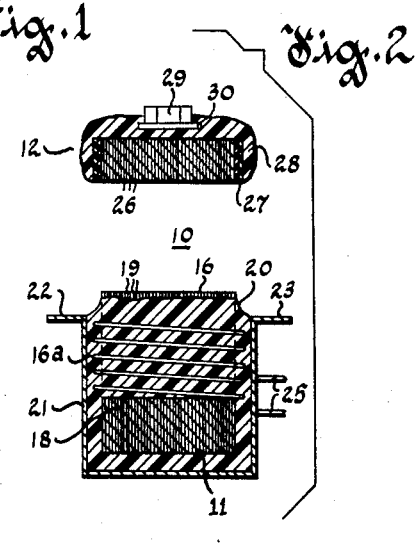
Fig. 2 is a cross sectional view taken through the center of the device shown in Fig. 1.
Figure 3:
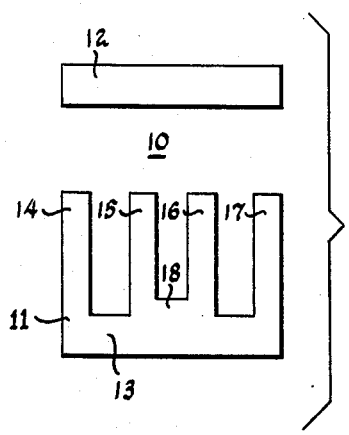
Fig. 3 illustrates schematically the armature and core of the device shown in Fig. 1.

Referring to Figs. 1, 2 and 3 an electromagnetic device embodying the invention is designated generally as 10. The device 10 has a four-legged stationary frame portion or core 11 and a movable armature 12 shown spaced from the core. Core 11 has an intermediate portion or yoke 13 and four parallel pole pieces or legs 14, 15, 16 and 17 formed integrally with the yoke perpendicularly along the length of the latter. Yoke 13 is substantially larger in cross section at its mid-portion 18 between pole pieces 15 and 16 as shown in Fig. 3, to accommodate the magnetic fluxes of both the inner and outer pairs of pole pieces. Surrounding the respective pole pieces are four preformed multiple turn operating coils 14a, 15a, 16a and 17a for introducing magnetic fields in the air gaps between the pole pieces and armature 12. Core 11 is constructed of a plurality of thin flat laminations 19 of suitable magnetic material such as Armco TO oriented iron or the like separated from one another by thin layers or coatings of insulating material (not shown) which may be previously applied to the lamination stock material. The primary purpose of laminating the core is to reduce eddy current losses caused by the alternating magnetic flux. The laminated core is held together by being impregnated with suitable adhesive to bond the laminations together. The core and coil assembly is potted in thermosetting resin 20 in an open end supporting enclosure 21 of non-magnetic material such as stainless steel or the like so that the free ends of the pole pieces extend through and slightly above the open end of the enclosure to facilitate grinding the sealing surfaces of the pole pieces. Enclosure 21 is provided with flanges 22 and 23 on opposite side thereof, each flange having one or more holes 22a and 23b therethrough to facilitate securing the supporting enclosure to a stationary base. A suitable number of holes 24 are provided on one side wall of the enclosure to accommodate terminals 25 shown in Fig. 2 to which the coil windings are connected.

Armature 12 is similarly constructed of a plurality of thin flat laminations 26 of magnetic material such as Armco TO oriented iron or the like separated from one another by thin layers or coatings of insulating material (not shown) which may be previously applied to the laminations stock material. The laminated armature is held together by being impregnated with a suitable adhesive to bond the laminations together, wrapped with a plurality of layers 27 of glass tape and potted in a block 28 of thermo-setting resin. One side of block 28 is open to expose the sealing surface of the armature while the other side has embedded in the resin a nut 29 and plate 30 rigidly secured to one another or other suitable means for attaching armature 12 to a driven element for actuating contacts and the like. Armature 12 is normally biased away from the pole pieces by suitable means (not shown) to provide air gaps therebetween.

An electrical circuit for energizing the electromagnetic device of Figs. 1, 2 and 3 is shown in Fig. 4. The energizing circuit comprises conductors L1 and L2 connectable through suitable switches to an alternating current power suply source (not shown). Operating coils 14a and 17a which surround the outer pole pieces 14 and 17, respectively, of core 11 are series connected directly across power supply conductors L1 and L2 while operating coils 15a and 16a which surround the inner pole pieces 15 and 16, respectively, of core 11 are series connected with a capacitor 31 and resistor 32 across the power supply conductors. If desired, resistor 32 may be formed integrally with coils 15a and 16a by winding the latter with suitable resistance wire. When power is supplied to conductors L1 and L2 from an alternating current power supply source, coils 14a and 17a are energized in a given phase relative to the phase of the power supply source. Coils 15a and 16a being in series connection with capacitor 31 and resistor 32 are energized in a phase displaced relative to the phase of coils 14a and 17a. Upon the energization of the two pairs of coils, armature 12 is attracted into contact with the pole pieces and remains in contact therewith so long as the coils remain energized. When the coils are deenergized, armature 12 is released to return to its normally open position by force of the aforementioned biasing means. The primary function of capacitor 31 is to shift the phase of the alternating current flowing through coils 15a and 16a relative to the phase of the current in coils 14a and 17a so that the magnetic fluxes developed by the respective pairs of coils have a phase displacement of approximately 90 degrees. As a result, the total attractive flux has an absolute value which is maintained above zero value at all times throughout the cyclic variations of the alternating current. Since coils 15a and 16a which are energized in one phase surround the inner pair of pole pieces while coils 14a and 17a which are energized in a different phase surround the outer pair of pole pieces and each pair of pole pieces is symmetrically arranged with respect to the center of the device, the magnetic forces developed thereby will always have a fixed central point of application to the armature. This results in an electromagnetic device having a low level of noise and minimum wear.

The aforementioned phase relationship is obtained by providing capacitor 31 with a value of capacitance such that the capacitive reactance is approximately equal to the inductive reactance of coils 15a and 16a to effect approximate series resonance in the circuit. An essential feature of the invention is the provision of an arrangement that will afford use of a capacitor 31 having a small value. Coils 15a and 16a have twice the number of turns required to provide equal voltages across the inner and outer pairs of coils. Thus, the voltage across coils 15a and 16a is twice the voltage across coils 14a and 17a. Since the inductance varies as the square of the number of turns, the inductance of coils 15a and 16a would be four times as great with twice the aforementioned number of turns. Therefore, to have approximate series resonance in the circuit, the value of capacitance need be only one-fourth as large. Since the number of turns has been doubled, one half the current is required to provide the same number of ampere turns in the phase shifted inner coils. This necessitates a larger value of total series resistance to effect the current reduction. Since power loss varies as the square of the current and only as the first power of the resistance, the series resistance consumes less power in the novel arrangement.

Fig. 5, wherein successive values of armature pull are plotted against lengths of air gap or armature stroke to provide pull curves for the electromagnetic device, graphically depicts the advantageous results afforded by the present invention. Curves A, B and C show pull characteristics for approximately 100, 65 and 32 percent normal coil voltage, respectively, while curve D graphically depicts the load characteristics. Although the aforementioned curves A, B and C depict approximate values of armature pull throughout the armature stroke, it should be noted that not only at 100 percent normal coil voltage but also at 65 percent normal coil voltage, the novel device affords sufficient pull to overcome the opposing force of the load.

Fig. 6, wherein successive values of applied voltage are plotted against values of exciting current, graphically depicts flux saturation characteristics of the novel electromagnetic device. Curve E shows the flux saturation characteristics for the pair of inner phase-shifted coils while curve F shows the flux saturation characteristics for the pair of outer line coils. An examination of these curves reveals that while the inductance of the out-of-phase coils could change substantially when the core is driven to saturation as shown by the upper portion of curve E, the device has a wide range of operation in the substantially linear portions of the curves.

I claim:

1. In an electromagnetic device, a magnetic core having a plurality of spaced pole pieces, an energizing coil surrounding each of said pole pieces, a movable armature in cooperative relation with said pole pieces, an alternating current supply source, means comprising capacitor means in circuit with one pair of said coils for connecting said source to energize pairs of said coils with out-of-phase alternating currents to maintain the absolute value of the total attractive flux above zero value throughout the cyclic variations of the alternating current, and means integral with said one pair of coils for decreasing the value of capacitance required to provide resonance in said circuit.

2. The combination according to claim 1 wherein the last mentioned means comprises a number of turns in said one pair of coils affording a voltage thereacross having approximately double the value of the voltage across another pair of said coils.

3. In an electromagnetic device, a magnetic core having a plurality of spaced pole pieces, a coil surrounding each of said pole pieces, an armature in cooperative relation with said pole pieces, and means for supplying pairs of said coils with substantially 90 degrees out-of-phase alternating currents comprising phase shifting means in circuit with one of said pairs of coils to maintain the absolute value of the total attractive flux above zero value throughout the cyclic variations of the alternating currents, said phase shifting means comprising a capacitor and resistance means in circuit with said one pair of coils, said capacitor having a value affording approximate resonance in the circuit.

4. In an electromagnetic device, a magnetic core having a plurality of spaced pole pieces, a coil surrounding each of said pole pieces, an armature in cooperative relation with said pole pieces, and means for supplying pairs of said coils with substantially 90 degrees out-of-phase alternating currents comprising phase shifting means in circuit with one of said pairs of coils to maintain the absolute value of the total attractive flux above zero value throughout the cyclic variations of the alternating currents, said phase shifting means comprising a capacitor and resistance means in series connection with said one pair of coils, said capacitor having a value affording approximate series resonance in the circuit.

References Cited in the file of this patent

UNITED STATES PATENTS

| 779,432 | Lindquist | Jan. 10, 1905 |
| 2,591,520 | De Fligue | Apr. 1, 1952 |
| 2,775,742 | Brogue | Dec. 25, 1956 |

FOREIGN PATENTS

| 11,614 | Great Britain | May 10, 1910 |
| 943,740 | France | Mar. 16, 1949 |

OTHER REFERENCES

Resonant Electrical Control Systems, Electrical Engineering, October 1943, pages 436–439.